United States Patent
Huelsen et al.

(10) Patent No.: US 12,509,159 B2
(45) Date of Patent: Dec. 30, 2025

(54) VEHICLE ROOF COMPRISING A ROOF SKIN ASSEMBLY AND A SENSOR MODULE

(71) Applicant: Webasto SE, Stockdorf (DE)

(72) Inventors: Michael Huelsen, Stockdorf (DE); Michael Respondek, Stockdorf (DE); Dirk Legler, Stockdorf (DE); Sascha Dietrich, Stockdorf (DE); Johannes Thannheimer, Stockdorf (DE); Thomas Columbus, Stockdorf (DE); Andrea Kramer, Stockdorf (DE); Michael Deppe, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 403 days.

(21) Appl. No.: 18/246,427

(22) PCT Filed: Sep. 28, 2021

(86) PCT No.: PCT/EP2021/076663
§ 371 (c)(1),
(2) Date: Mar. 23, 2023

(87) PCT Pub. No.: WO2022/069476
PCT Pub. Date: Apr. 7, 2022

(65) Prior Publication Data
US 2023/0399058 A1      Dec. 14, 2023

(30) Foreign Application Priority Data
Sep. 29, 2020   (DE) .................... 10 2020 125 410.5

(51) Int. Cl.
*B62D 25/06*      (2006.01)
*B60W 30/10*     (2006.01)

(52) U.S. Cl.
CPC ............. *B62D 25/06* (2013.01); *B60W 30/10* (2013.01); *B60W 2420/403* (2013.01); *B60W 2420/408* (2024.01)

(58) Field of Classification Search
CPC ............ B60H 1/00271; B60H 1/00207; B60H 2001/00235
See application file for complete search history.

(56) References Cited

U.S. PATENT DOCUMENTS 10,099,630 B1 *  10/2018  Krishnan .............. G01S 7/4813
11,240,941 B2 *   2/2022  Frederick ............. G05D 1/0088
(Continued)

FOREIGN PATENT DOCUMENTS

CN      115743315 A  *  3/2023  ............ B62D 25/06
EP       3034359 A1      6/2016
(Continued)

OTHER PUBLICATIONS

International Search Report for PCT/EP2021/076663 mailed Jan. 12, 2022, in English and German (5 pages).
(Continued)

*Primary Examiner* — Faye M Fleming
(74) *Attorney, Agent, or Firm* — Fitch, Even, Tabin & Flannery, LLP

(57) ABSTRACT

A vehicle roof having a roof skin assembly, a roof substructure, which is disposed below the roof skin assembly, and at least one sensor module having at least one environment sensor for detecting a vehicle environment, the environment sensor being disposed in a sensor housing having a sensor window. The roof skin assembly has a sensor cutout accommodating the sensor housing in a circumferentially sealing manner with the result that the sensor window forms a visible outer roof surface.

11 Claims, 2 Drawing Sheets

(56) References Cited

U.S. PATENT DOCUMENTS

| | | | | |
|---|---|---|---|---|
| 11,858,425 | B2* | 1/2024 | Higashimachi | B60R 11/00 |
| 12,092,755 | B2* | 9/2024 | Huelsen | G01S 7/4813 |
| 12,172,604 | B2* | 12/2024 | Huelsen | B62D 25/06 |
| 12,319,349 | B2* | 6/2025 | Huelsen | B62D 27/026 |
| 2017/0257535 | A1 | 9/2017 | Minikey, Jr. et al. | |
| 2019/0176717 | A1 | 6/2019 | Gomes et al. | |
| 2022/0289301 | A1 | 9/2022 | Huelsen et al. | |
| 2023/0073687 | A1* | 3/2023 | Lindner | B60H 1/245 |

FOREIGN PATENT DOCUMENTS

| | | | | |
|---|---|---|---|---|
| KR | 19980061886 A | * | 10/1998 | B60H 1/00978 |
| WO | 2021032597 A2 | | 2/2021 | |
| WO | 2022069476 A1 | | 4/2022 | |
| WO | 2021032597 A3 | | 9/2022 | |

OTHER PUBLICATIONS

International Preliminary Report on Patentability for PCT/EP2021/076663; mailed Mar. 28, 2023 in German and English (14 pages).

* cited by examiner

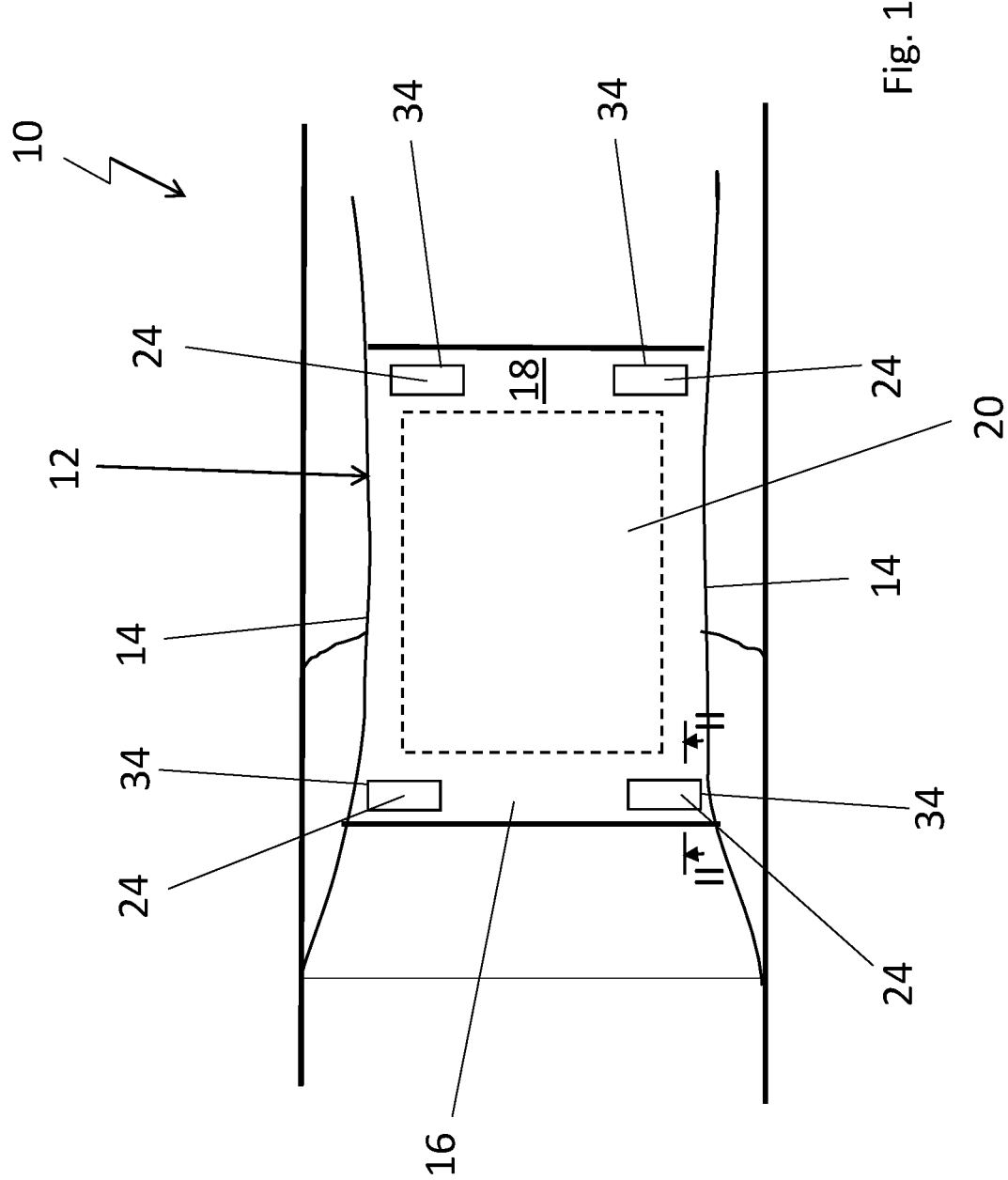

VEHICLE ROOF COMPRISING A ROOF
SKIN ASSEMBLY AND A SENSOR MODULE

CROSS-REFERENCE TO RELATED APPLICATIONS

This application is a U.S. national phase application filed under 35 U.S.C. § 371 of International Application No. PCT/EP2021/076663, filed Sep. 28, 2021, designating the United States, which claims priority from German Patent Application Number 10 2020 125 410.5, filed on Sep. 29, 2020, which are hereby incorporated herein by reference in their entirety for all purposes.

FIELD

The invention relates to a vehicle roof, in particular a vehicle roof for a passenger car, the vehicle roof comprising the features of the preamble of claim 1.

BACKGROUND

Such a vehicle roof is known from practice and can be a roof module which can be placed on top a vehicle body of a passenger car, which forms a vehicle carcass, as a separate component. For this purpose, the vehicle body comprises roof rails, which are supports of the vehicle carcass for the roof module. The vehicle roof comprises a roof skin assembly as a visible outer surface, the roof skin assembly being disposed above a roof substructure, which forms a point of intersection with the roof rails. The roof skin assembly can be at least partially transparent with the result that a panoramic roof is formed. Moreover, the vehicle roof can be provided with a roof opening system which allows opening or closing a roof opening at will using a movable lid element. The roof skin assembly borders the roof opening in this case. In order to enable the motor vehicle in question to drive autonomously or semi-autonomously, the known vehicle roof has a sensor module which has an environment sensor for detecting a vehicle environment. So the environment sensor can be used to monitor the vehicle environment. The environment sensor is disposed in a sensor housing, which has a sensor window, via which the environment sensor can communicate with the vehicle environment. In the case of existing vehicle roofs, the sensor module has been placed on top the roof skin assembly in such a manner that it forms the highest point of the vehicle. However, the sensor module placed on top leads to a vehicle appearance which typically does not satisfy customer demands.

SUMMARY

Hence, the object of the invention is to provide a vehicle roof of the kind described above whose sensor module including the environment sensor is integrated into the roof structure in an optically pleasing manner.

According to the invention, this object is attained by the vehicle roof having the features of claim 1.

So the invention proposes a vehicle roof comprising a roof skin assembly, a roof substructure, which is disposed below the roof skin assembly, and at least one sensor module having at least one environment sensor for detecting a vehicle environment, the environment sensor being disposed in a sensor housing having a sensor window. The roof skin assembly has a sensor cutout accommodating the sensor housing in a circumferentially sealing manner with the result that the sensor window forms a visible outer roof surface. So the sensor housing of the sensor module is inserted in the sensor cutout of the roof skin assembly in such a manner that moisture and dirt cannot enter an area below the roof skin assembly from outside at the edge of the sensor housing. The sensor window of the sensor housing directly forms a visible outer roof surface or, in the broadest sense, a roof skin portion. A separate cover or a special adjustment of the roof skin assembly to the specification of the environment sensor for forming a roof see-through area is not necessary. Thus, it is possible for the roof skin assembly to be configured independently of the environment sensor in terms of material.

The environment sensor of the sensor module can be configured in various ways, can use electromagnetic radiation and/or acoustic waves and can comprise a lidar sensor, a radar sensor, an optical sensor, such as a7 camera, and/or the like, for example.

If the environment sensor is a lidar sensor, it preferably operates in a wavelength range of approximately 905 nm or approximately 1550 nm. A camera used as an environment sensor can operate in the wavelength range of visible light and/or in the infrared range.

The roof substructure can form the point of intersection of the vehicle roof with a vehicle carcass and can in particular comprise a roof frame. The roof skin assembly can be attached to the roof frame. The sensor module can be mounted on top the roof substructure or the roof frame.

In an advantageous embodiment of the vehicle roof according to the invention, a sealing assembly circumferentially following an edge of the sensor cutout is disposed between the sensor housing and the roof skin assembly in order to ensure that the sensor housing is accommodated in the sensor cutout of the roof skin assembly in a sealing manner. The sealing assembly is preferably a single piece.

The sealing assembly is advantageously attached to the roof skin assembly and/or the sensor housing so that it is captively accommodated by the vehicle roof.

In a specific embodiment of the vehicle roof according to the invention, the sealing assembly comprises what is referred to as an H-shape seal, which straddles an edge of the roof skin assembly defining the sensor cutout. Furthermore, the H-shape seal, which, by definition, has two seal grooves separated from each other by a web, can straddle an edge or a lip of a fastening element of the sensor housing. The fastening element can be a separate component, which is connected to the sensor housing, or can be formed integrally on the sensor housing.

The sensor housing is preferably attached to the roof skin assembly via a connecting element so that the sensor housing can be stably arranged in an exact position relative to the roof skin assembly or the roof substructure. The connecting element can be the structural element which engages the sealing assembly, which is in particular an H-shape seal.

The roof skin assembly can have a collar, which defines the sensor cutout, in order to stabilize the connection of the sensor module to the roof skin assembly. The collar forms a short tubular portion in which the sensor housing of the environment sensor or of the sensor module is inserted. The connecting element, which serves to adjust the sensor housing relative to the roof skin assembly, can be connected to the collar.

For a stable arrangement of the sensor module relative to the vehicle structure, the sensor module with the environment sensor is preferably mounted on top of the roof substructure, which can comprise a roof frame. In the installed position, the roof substructure has a defined orientation relative to the vehicle carcass.

In the installed position, the sensor module may have to be exactly readjusted. Hence, a specific embodiment of the vehicle roof according to the invention comprises an adjusting feature for adjusting the sensor module relative to the roof substructure.

A preferred embodiment of the roof according to the invention is a roof module. In an integrated manner, such a roof module forms a constructional element in which components required for autonomous or semi-autonomous driving of the vehicle in question are incorporated. The roof module, in which a plurality of functional elements can thus be integrated, is connected to a vehicle body or a vehicle carcass, which comprises roof rails, such as roof side rails and transverse roof rails, as a compact structural unit by a vehicle manufacturer. Thus, the vehicle roof embodied as a roof module is a roof sensor module (RSM) which enables the vehicle in question to drive autonomously or semi-autonomously.

In an autonomous driving mode, the vehicle quipped with the vehicle roof according to the invention and configured as an autonomously driving vehicle drives on its own without at least substantial interference by a driver. In a semi-autonomous driving mode, the roof according to the invention forms part of a driver assistance system, for example.

The vehicle roof according to the invention can be provided with a transparent fixed roof portion, which is part of the roof skin assembly, and/or a roof opening system for a roof opening, which can be defined by an edge of the roof skin assembly.

In particular, the vehicle roof according to the invention is a roof of a passenger car. However, it can also be a roof of a utility vehicle, which is a delivery van, a bus, an autonomously driving small bus, such as what is referred to as a people mover, or a tractor unit of a truck, for example Furthermore, the vehicle roof according to the invention can have a roof skin assembly which is a single component or composed of multiple components and which at least partially covers the sensor module or the housing of the environment sensor.

The sensor window of the sensor housing is of course made of a material transparent to the wavelengths used by the environment sensor. In particular, the sensor window is configured in such a manner that signals of the environment sensor which are in a wavelength range between 300 nm and 2000 nm can pass through it. If the environment sensor is a radar sensor, the sensor window is transparent to radar beams.

The invention also relates to a motor vehicle which comprises a vehicle roof of the kind described above and whose vehicle carcass can therefore in particular be provided with a roof module configured as a roof sensor module.

Other advantages and advantageous configurations of the subject matter of the invention are apparent from the description, the drawing and the claims.

BRIEF DESCRIPTIONS OF THE DRAWINGS

Exemplary embodiments of a motor vehicle comprising a vehicle roof according to the invention are schematically illustrated in the drawing and will be discussed in more detail in the following description.

FIG. 1 is a top view of a motor vehicle having a vehicle roof according to the invention;

DETAILED DESCRIPTION

Figure 3:
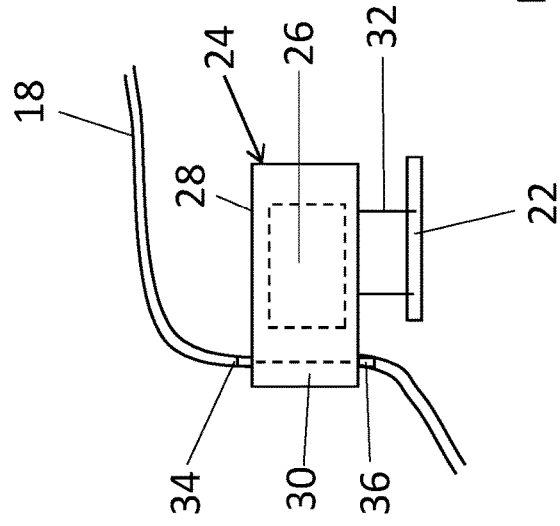
FIG. 3 is a section through a second embodiment of a vehicle roof, the section corresponding to FIG. 2.

The drawing shows a motor vehicle 10, which is a passenger car and has a vehicle roof 12, which comprises a roof side rail 14 on either side of a longitudinal center roof plane, roof side rails 14 being part of a vehicle body, which is a vehicle carcass. Vehicle roof 12 comprises a roof module 16 between roof side rails 14, roof module 16 being attached to roof side rails 14, which form a carcass support structure.

Roof module 16 comprises a single-piece or multi-piece roof skin assembly 18, which forms a transparent roof portion 20 in a central area, roof portion 20 allowing light to enter a vehicle interior. Roof skin assembly 18 is attached to a circumferential roof frame 22, which is part of a roof substructure of roof module 16 and forms a point of intersection of roof module 16 with the vehicle body.

Roof module 16 is configured as a roof sensor module (RSM) which is equipped with devices enabling motor vehicle 10 to drive autonomously. To this end, roof module 16 has a sensor system which comprises respective sensor modules 24 at least in the four corner areas of roof module 16, each sensor module 24 being provided with at least one environment sensor 26, which can detect the vehicle environment so as to enable motor vehicle 10 to drive autonomously. A current traffic situation can be determined by evaluating the measuring signals of environment sensors 26 by means of a controller of motor vehicle 10, which allows motor vehicle 10 to autonomously or automatically adapt to the current traffic situation and behave accordingly.

Figure 2:
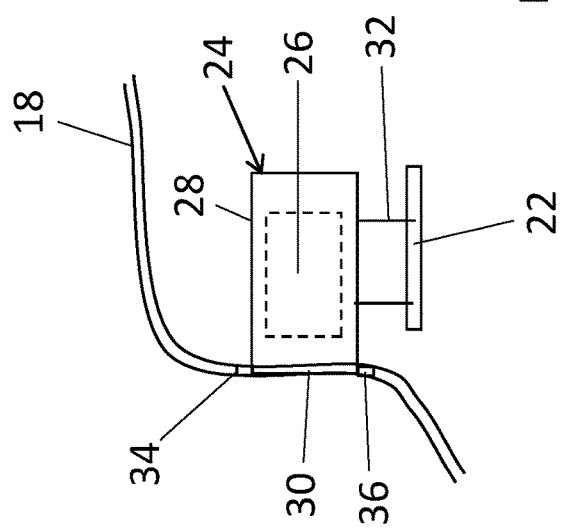
FIG. 2 is a section through the vehicle roof of FIG. 1 along line II-II in FIG. 1.

As FIG. 2 shows in representation of all sensor modules 24, environment sensors 26 are each accommodated in a sensor housing 28, which is provided with a sensor window 30, via which environment sensor 26 in question can communicate with the vehicle environment and whose material is transparent to the wavelengths used by environment sensor 26.

Environment sensors 26 can be configured in various ways and can comprise a lidar sensor, a radar sensor, a camera, an antenna device and/or another suitable type of sensor, for example.

As can further be seen in FIG. 2, sensor modules 24 are each mounted on top of roof frame 22 via a support member 32, which is a support plate, for example. Support member 32 can be provided with an adjusting feature for finely adjusting environment sensor 26 relative to roof frame 22 in the installed position.

Roof skin assembly 18 comprises a sensor cutout 34 for each sensor module 24, each sensor cutout 34 accommodating sensor housing 28 in a circumferentially sealing manner with the result that sensor window 30 forms a visible outer roof surface. Sensor window 30 is at least essentially flush with the outer surface of roof skin assembly 18.

A sealing assembly 36 is disposed between sensor housing 28 and roof skin assembly 18, sealing assembly 36 circumferentially following an edge of sensor cutout 34. Sealing assembly 36 is press-fitted to sensor housing 28.

FIG. 3 shows an alternative embodiment of a vehicle roof according to the invention, which essentially corresponds to the embodiment of FIGS. 1 and 2 but differs from it in that it has a sensor housing 28 provided with a sensor window 30 having a stronger curvature than the adjacent areas of roof skin assembly 18 with the result that sensor housing 28 protrudes over roof skin assembly 18. Such a sensor window is suitable in particular when using a rotating PUK sensor or the like as environment sensor 26.

Otherwise, the embodiment of FIG. 3 corresponds to the embodiment of FIGS. 1 and 2, which is why reference is made to the explanations above in this regard.

Figure 4:
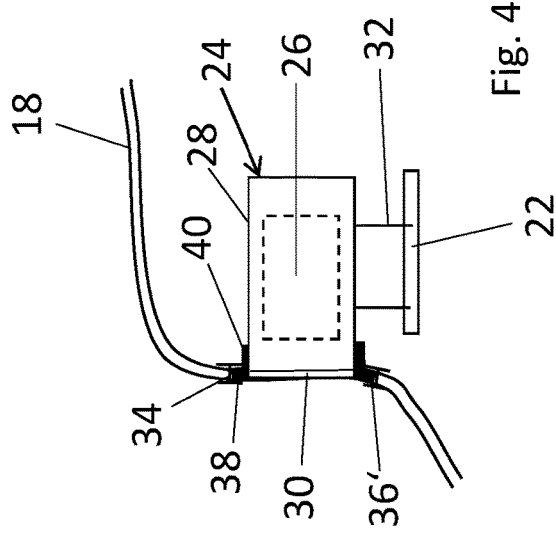
FIG. 4 is also a section through a third embodiment of a vehicle roof, the section corresponding to FIG. 2.

FIG. 4 shows another embodiment of a vehicle roof according to the invention, which again largely corresponds to the embodiment of FIGS. 1 and 2 but differs from it in that it has what is referred to as an H-shape seal as a sealing assembly 36', i.e., a seal consisting of a profile whose cross section is H-shaped. A seal groove of the H-shape seal engages an edge of roof skin assembly 18. A second seal groove of the H-shape seal engages a circumferential lip 38 of a connecting element 40, which is attached to sensor housing 28 and can be formed by one or multiple L-profiles.

Otherwise, the embodiment of FIG. 4 corresponds to the embodiment of FIGS. 1 and 2.

Figure 5:
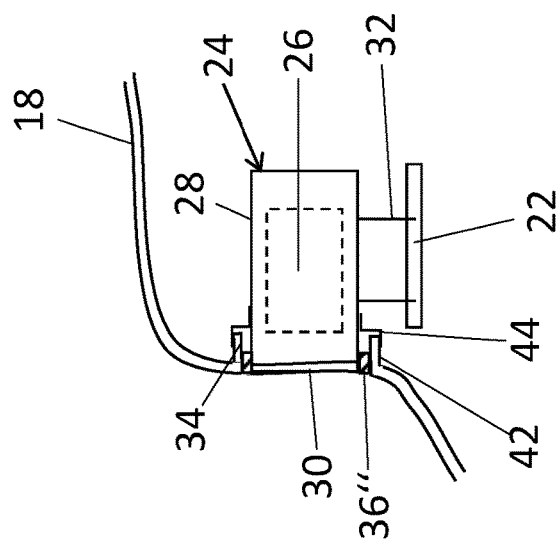
FIG. 5 is also a section through a fourth embodiment of a vehicle roof, the section corresponding to FIG. 2.

FIG. 5 shows another embodiment of a vehicle roof, which largely corresponds to the embodiment of FIGS. 1 and 2 but differs from it in that it comprises a roof skin assembly 18 provided with a sensor cutout 34 for each sensor module 24, each sensor cutout 34 being defined by a collar 42 formed integrally on roof skin assembly 18. A seal assembly 36", which is formed by an elastomer seal, is disposed between collar 42 and sensor housing 28 of environment sensor 26, sealing assembly 36" being pressfitted to collar 42 of roof skin assembly 18 and to sensor housing 28. Furthermore, a connecting element 44 is disposed between sensor housing 28 and collar 42 of roof skin assembly 18; connecting element 44 can be formed by support brackets or a support profile surrounding sensor housing 28. Alternatively or additionally, the seal assembly can also comprise a seal element between the roof skin assembly or the edge and the connecting element.

Otherwise, the embodiment of FIG. 5 corresponds to the embodiment of FIGS. 1 and 2, which is why reference is made to the explanations above in this regard in order to avoid repetition.

The invention claimed is:

1. A vehicle roof comprising;
   a roof skin assembly,
   a roof substructure, which is disposed below the roof skin assembly, and
   at least one sensor module having at least one environment sensor for detecting a vehicle environment,
   the environment sensor being disposed in a sensor housing having a sensor window,
   wherein the roof skin assembly has a sensor cutout accommodating the sensor housing in a circumferentially sealing manner with the result that the sensor window forms a visible outer roof surface.

2. The vehicle roof according to claim 1, wherein a sealing assembly is disposed between the sensor housing and the roof skin assembly, the sealing assembly circumferentially following an edge of the sensor cutout.

3. The vehicle roof according to claim 2, wherein the sealing assembly is attached to the roof skin assembly and/or the sensor housing and/or a connecting element between the roof skin assembly and the sensor housing.

4. The vehicle roof according to claim 2, wherein the sealing assembly comprises an H-shape seal straddling an edge of the roof skin assembly defining the sensor cutout.

5. The vehicle roof according to claim 1, wherein the sensor housing is attached to the roof skin assembly via a connecting element.

6. A vehicle roof comprising;
   a roof skin assembly,
   a roof substructure, which is disposed below the roof skin assembly, and
   at least one sensor module having at least one environment sensor for detecting a vehicle environment,
   the environment sensor being disposed in a sensor housing having a sensor window,
   wherein the roof skin assembly has a sensor cutout accommodating the sensor housing in a circumferentially sealing manner with the result that the sensor window forms a visible outer roof surface, and
   wherein the roof skin assembly has a collar defining the sensor cutout.

7. The vehicle roof according to claim 5, wherein the roof skin assembly has a collar defining the sensor cutout, and wherein the connecting element is attached to the collar.

8. The vehicle roof according to claim 1, wherein the sensor module is mounted on the roof substructure, which comprises a roof frame.

9. A vehicle roof comprising;
   a roof skin assembly,
   a roof substructure, which is disposed below the roof skin assembly, and
   at least one sensor module having at least one environment sensor for detecting a vehicle environment,
   the environment sensor being disposed in a sensor housing having a sensor window,
   wherein the roof skin assembly has a sensor cutout accommodating the sensor housing in a circumferentially sealing manner with the result that the sensor window forms a visible outer roof surface, and
   wherein the sensor module comprises an adjusting feature for adjusting it relative to the roof substructure.

10. The vehicle roof according to claim 1, wherein the vehicle roof is a roof module.

11. A motor vehicle comprising a vehicle roof according to claim 1.

* * * * *